R. STANLEY.
Churn.

No. 61,691.  Patented Jan. 29, 1867.

Witnesses:
Theo Tusch
J. A. Serrice

Inventor:
Robt Stanley
Per Munn &
Attorneys

United States Patent Office.

ROBERT STANLEY, OF CHARITON, IOWA.

Letters Patent No. 61,691, dated January 29, 1867.

---

IMPROVEMENT IN CHURNS.

---

The Schedule referred to in these Letters Patent and making part of the same.

---

TO ALL WHOM IT MAY CONCERN:

Be it known that I, ROBERT STANLEY, of Chariton, in the county of Lucas, and State of Iowa, have invented a new and useful Improvement in Churns; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish a churn by the use of which the churning may be quickly and thoroughly performed, developing and gathering all the butter that may be in the milk. And it consists in an improved churn formed by the combination of the vertical tapering flanges or ribs formed upon the interior surface of the churn body, the triangular blades, horizontal arms, and vertical shaft of the dasher, and the horizontal band-wheels and band with each other, the whole being constructed and arranged as hereinafter more fully described.

Figure 1:
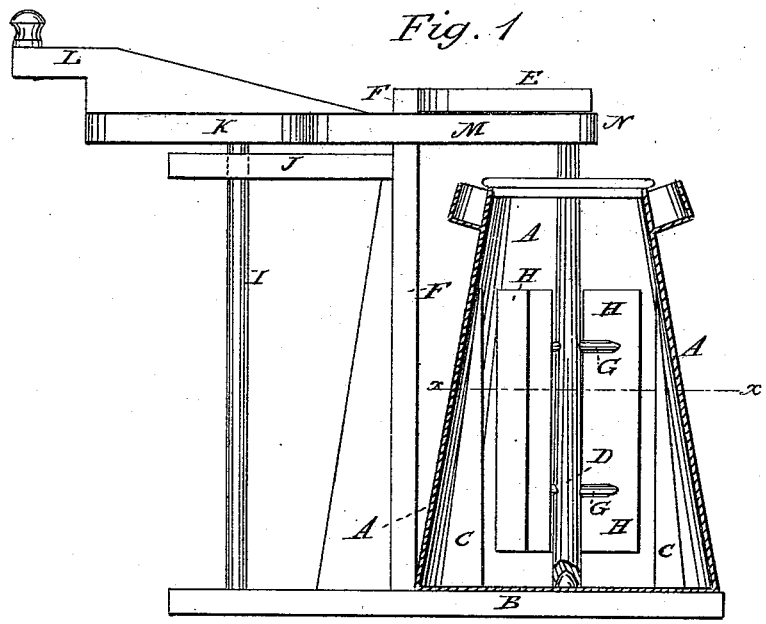
Figure 1 is a side view of my improved churn partly in vertical section through the body of said churn.
Figure 2:
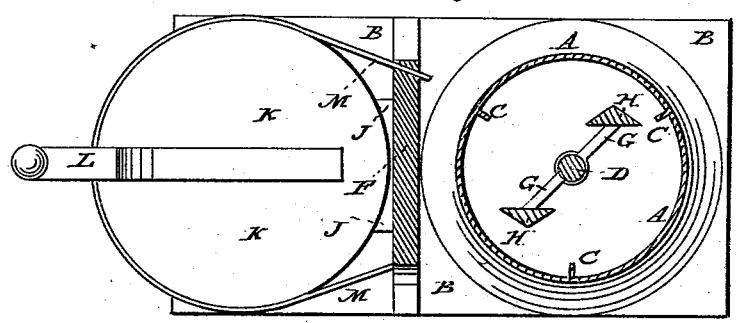
Figure 2 is a top view of the same, partly in horizontal section through the line $x\,x$, fig. 1.

A is the body of the churn, which is made tapering in the ordinary manner. The body A of the churn stands upon the platform B, and may, if thought necessary, be kept steady by points or knobs attached to its bottom, and entering sockets formed in said platform B. C are tapering flanges or ribs, the outer edges of which are securely attached to the inner surface of the churn body A in such a way that their inner edges may be vertical, as shown in fig. 1. D is the vertical dasher-shaft, the lower end of which is pivoted to the centre of the bottom $a'$ of the churn, and its upper end to the arm E, the other end of which is securely attached to the upright F. G are horizontal arms attached to or passing through the shaft D, as shown in figs. 1 and 2. H are the triangular dasher blades, which are made in the shape and attached to the ends of the arms G in the positions shown in fig. 2, so that when the dasher is revolved in one direction the milk may be forced against the flanges or ribs C, and thus thrown into violent agitation, developing all the butter that may be in the milk in a very short time, and when the dasher is revolved in the other direction the butter will be "gathered." I is a vertical shaft, the lower end of which is pivoted to the platform B, and its upper end revolves in bearings in the arm J securely attached to the upright F. To the upper end of the shaft I is attached the large band-wheel K, to the upper side of which is attached the crank or handle L by means of which the dasher is operated. M is a band which passes around the large band-wheel K, and the small band-wheel N which is attached to the upper end of the vertical dasher-shaft D.

I claim as new, and desire to secure by Letters Patent—

An improved churn formed by the combination of the vertical tapering flanges or ribs C, the triangular blades H, horizontal arms G, and vertical shaft D of the dasher, and the horizontal band-wheels K N, and band M, with each other, and with the body A of the churn, substantially as herein shown and described.

ROBT. STANLEY.

Witnesses:
ARTEMAS RUSH,
HIRAM L. BALCAM.